(12) United States Patent
Alqahtani (10) Patent No.: US 10,294,155 B2
(45) Date of Patent: May 21, 2019

(54) RECYCLED PLASTIC AGGREGATE FOR USE IN CONCRETE

(71) Applicant: KING SAUD UNIVERSITY, Riyadh (SA)

(72) Inventor: Fahad Khshim Alqahtani, Riyadh (SA)

(73) Assignee: King Saud University, Riyadh (SA)

( * ) Notice: Subject to any disclaimer, the term of this patent is extended or adjusted under 35 U.S.C. 154(b) by 0 days.

(21) Appl. No.: 15/656,066

(22) Filed: Jul. 21, 2017

(65) Prior Publication Data

US 2017/0320776 A1    Nov. 9, 2017

Related U.S. Application Data

(62) Division of application No. 14/872,099, filed on Sep. 30, 2015.

(51) Int. Cl.
| | |
|---|---|
| *B29B 17/04* | (2006.01) |
| *B29K 67/00* | (2006.01) |
| *C04B 14/06* | (2006.01) |
| *C04B 18/02* | (2006.01) |
| *C04B 18/08* | (2006.01) |
| *C04B 18/12* | (2006.01) |
| *C04B 20/00* | (2006.01) |
| *C04B 28/02* | (2006.01) |
| *B29K 105/16* | (2006.01) |
| *B29K 105/26* | (2006.01) |
| *B29K 509/00* | (2006.01) |

(52) U.S. Cl.
CPC .......... *C04B 18/022* (2013.01); *C04B 14/068* (2013.01); *C04B 18/08* (2013.01); *C04B 18/12* (2013.01); *C04B 20/0076* (2013.01); *C04B 28/02* (2013.01); *B29B 17/04* (2013.01); *B29K 2067/003* (2013.01); *B29K 2105/16* (2013.01); *B29K 2105/26* (2013.01); *B29K 2509/00* (2013.01); *Y02W 30/92* (2015.05); *Y02W 30/93* (2015.05)

(58) Field of Classification Search
CPC ...................................................... C04B 18/022
See application file for complete search history.

(56) References Cited

U.S. PATENT DOCUMENTS

| | | | |
|---|---|---|---|
| 5,217,800 A | * | 6/1993 | Pentecost ............ B29B 17/0412 264/176.1 |
| 6,030,572 A | | 2/2000 | Berto |

(Continued)

FOREIGN PATENT DOCUMENTS

CN    104193220 A    12/2014

OTHER PUBLICATIONS

Xanthos (Plastics Processing, Kirk-Othmer Encyclopedia of Chemical Technology, 2003) (Year: 2003).*

(Continued)

*Primary Examiner* — Liam J Heincer
(74) *Attorney, Agent, or Firm* — Richard C. Litman (57) ABSTRACT

The synthetic recycled plastic aggregate for use in concrete is a composite material containing between 30% and 50% by weight shredded recycled plastic, the balance being a filler embedded in a matrix of the recycled plastic. The recycled plastic includes polyethylene terephthalate (PET). The filler can include dune sand, fly ash and quarry fines. The synthetic recycled plastic aggregate is best used to make concrete with a water-to-cement ratio of at least 0.5.

7 Claims, 7 Drawing Sheets

(56) References Cited

U.S. PATENT DOCUMENTS

| | | | |
|---|---|---|---|
| 6,109,006 A * | 8/2000 | Hutchinson | B29C 47/0023 |
| | | | 215/13.1 |
| 6,488,766 B2 | 12/2002 | Balkim | |
| 6,669,773 B2 | 12/2003 | Malloy et al. | |
| 6,899,839 B2 * | 5/2005 | Fifield | B29C 67/243 |
| | | | 264/109 |
| 7,772,302 B2 | 8/2010 | Partanen et al. | |
| 8,921,463 B1 | 12/2014 | Alqahtani et al. | |
| 2002/0153285 A1 * | 10/2002 | Arakane | B03B 9/061 |
| | | | 209/3 |
| 2003/0065082 A1 * | 4/2003 | Blanken | B29B 17/0026 |
| | | | 524/492 |
| 2006/0106191 A1 * | 5/2006 | Lo Presti | C04B 18/022 |
| | | | 528/272 |
| 2010/0324189 A1 * | 12/2010 | Brockmuller | E06B 3/221 |
| | | | 524/413 |
| 2012/0015066 A1 | 1/2012 | White | |
| 2012/0119414 A1 * | 5/2012 | Van Helden | B29B 7/007 |
| | | | 264/239 |
| 2013/0130009 A1 * | 5/2013 | van Helden | C04B 26/006 |
| | | | 428/220 |
| 2013/0154157 A1 * | 6/2013 | Thompson | B29C 43/003 |
| | | | 264/279.1 |

OTHER PUBLICATIONS

Any identified foreign patents and/or publications have been properly submitted in parent U.S. Appl. No. 14/872,099, filed Sep. 30, 2015, the priority of which is claimed.

* cited by examiner

RECYCLED PLASTIC AGGREGATE FOR USE IN CONCRETE

CROSS-REFERENCE TO RELATED APPLICATION

This application is a divisional application of U.S. patent application Ser. No. 14/872,099, tiled on Sep. 30, 2015, presently pending.

BACKGROUND OF THE INVENTION

1. Field of the Invention

The present invention relates to concrete materials, and particularly to a synthetic recycled plastic aggregate for use in concrete.

2. Description of the Related Art

Concrete is one of the most important and frequently used materials in civil engineering, such as in high-low buildings, bridges, infrastructure and environmental protection facilities. Concrete is a composition of an aggregate and a binder substance. The binder substance and the aggregate are combined by a moistening agent to allow the binder substance to link with aggregate particles and form a solid block. Generally the aggregate or aggregates make up about 60% to 75% of the total concrete volume. Therefore, the type and proportion of the aggregate used in concrete can significantly impact the weight, strength, durability, and elastic properties, of the concrete. However, as a result of environmental concerns, there has been a growing trend for the use of secondary, industrial, granular and recycled plastic wastes as recycled and/or artificial aggregate instead of natural aggregate in the production of concrete as a direct replacement of coarse/fine natural aggregate. For example, air-cooled, blast furnace, and steel furnace slag have been used to replace coarse aggregate materials and fly ash and furnace bottom ash have been used to replace fine aggregate materials. Furthermore, by product materials, such as silica fume and rice husk ash have been used as supplementary cementing materials as a partial replacement of cement.

Over the last 30 years, worldwide production of plastic grew by more than 500%. Current annual global production is estimated at over 100 million tons and is expected to increase by 3% a year. In the U.K., 7% of plastics are recycled each year, which is a small quantity when compared to the 275 million tons of natural aggregate used in concrete applications. About 80% of the plastic wastes are either left in stockpiles, as landfill material, or is illegally dumped. Most importantly, much of the non-decaying wastes will remain in the environment for hundreds, perhaps thousands of years. The non decaying waste will not only cause a waste disposal crisis, but also contribute to significant environmental problems.

Use of synthetic aggregate in concrete has been limited; however, because synthetic aggregates do not provide the same physical, chemical, or mechanical properties as natural aggregates.

Thus, a synthetic aggregate solving the aforementioned problems is desired.

SUMMARY OF THE INVENTION

The synthetic recycled plastic aggregate (RPA) for use in concrete is a composite material of recycled plastic having a filler encapsulated in the plastic. The recycled plastic includes polyethylene terephtalate (PET). The RPA includes between about 30% and 50% by weight recycled plastic, the balance being filler. For example, the RPA can include between about 30% and 50% by weight polyethylene terephthalate (PET), the balance being filler. The filler can include dune sand, fly ash, and quarry fines. The synthetic RPA is best used to make concrete with a water-to-cement ratio of at least 0.5.

A method of making synthetic RPA includes the steps of shredding and grinding recycled plastic, mixing the ground plastic with a filler to form a homogenized mixture, compressing the homogenized mixture in a mold, melting the plastic in the homogenized mixture to form a composite sheet or slab, and shredding the composite sheet or slab to form either coarse or fine aggregates for use in making concrete. The recycled plastic includes polyethylene terephthalate (PET) and the filler includes a granular waste, such as dune sand, fly ash, and/or quarry fines.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Referring to FIGS. 1-7, the synthetic recycled plastic aggregate (RPA) for use in concrete is a composite material containing between about 30% and 50% by weight shredded recycled plastic, the balance being filler. The recycled plastic includes polyethylene terephthalate (PET). Thus, for example, the synthetic RPA can include about 50% by weight PET and about 50% by weight filler. Alternatively, for example, the synthetic RPA can include about 30% by weight PET and about 70% by weight filler, The filler can be granular waste, such as dune sand, fly ash, and/or quarry fines. The filler can be embedded in a matrix of the recycled plastic. The concrete can have a water-to-cement ratio of at least 0.5.

A method of making concrete having the synthetic RPA includes the steps of shredding and grinding plastic, wherein the plastic includes polyethylene terephthalate (PET), mixing the shredded plastic with filler to form a homogenized mixture, compressing the homogenized mixture in a mold, melting the plastic in the homogenized mixture to form a composite sheet or slab, and crushing the composite sheet or slab to form either coarse or fine aggregates for use in making concrete. The filler can be granular waste such as dune sand, fly ash, and quarry fines.

In order to test the use of the synthetic RPA as an aggregate in concrete, different samples of the synthetic RPA were prepared. The synthetic RPA includes filler and plastic as described above. The filler used in the synthetic RPA is granular waste, such as dune sand, fly ash, or quarry fines. The particles of the filler, such as dune sand particles, preferably have a particle size less than or equal to 0.15 mm, for example. One manner in which this can be accomplished is by passing the filler, such as dune sand, through a sieve. After obtaining the particles of the desired size, the filler can be dried at room temperature. Preferably, the filler is free from any contamination.

The recycled plastic used in the samples of synthetic RPA tested was polyethylene terephthalate (PET). The plastic-filler percentages were adjusted to reach the optimal percentage, as illustrated in Table 1. Table 1 shows six different synthetic RPA compositions according to the present teachings, including two different percentages of recycled PET mixed with three different kinds of filler.

TABLE I

Composition of PET Composites

| Designation | Plastic Type | Plastic Percentage | Filler Type | Filler Percentage |
|---|---|---|---|---|
| $RP_3F_1A$ | PET | 50 | Dune Sand | 50 |
| $RP_3F_2A$ | PET | 50 | Fly Ash | 50 |
| $RP_3F_3A$ | PET | 50 | Quarry Fines | 50 |
| $RP_4F_1A$ | PET | 30 | Dune Sand | 70 |
| $RP_4F_2A$ | PET | 30 | Fly Ash | 70 |
| $RP_4F_3A$ | PET | 30 | Quarry Fines | 70 |

Once the filler, such as dune sand, is sieved and the fraction with the desired particle size (such as less than or equal to 0.15 mm) is selected, it is dried at room temperature.

The recycled plastic is collected and either sorted into different polymer groups, such as PET, or used "as is" in a mixed stream. Regardless of the type of plastic used, the recycled plastic stream should be separated from non-polymer products (such as wood, glass, or metal) and then shredded and processed by grinding to obtain particles with a maximum size of 2.36 mm. After the plastic and the filler are dried, they are mixed together within a mixing machine to produce a homogenized mixture. The homogenized mixture is then preheated for approximately one hour at a temperature of from about 110° C.±5° C.

Figure 1:
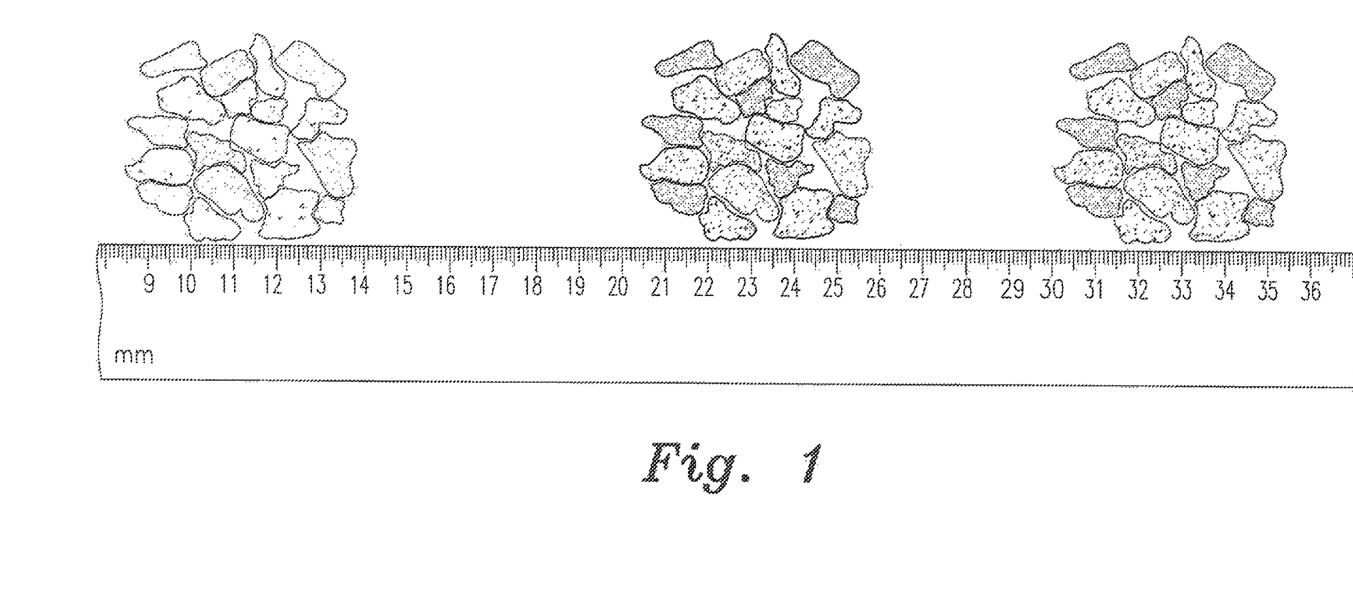
FIG. 1 is an environmental perspective view of samples of a synthetic recycled plastic aggregate for use in concrete according to the present invention, showing different types of synthetic recycled plastic aggregates having different compositions.

The homogenized mixture is then poured into a flat mold. After it is poured into the flat mold, the homogenized mixture is compressed. To compress the homogenized mixture, the mold containing the polymer-filler mixture is placed between two heated plates in a compression molding press machine. The compression molding machine is heated to a temperature of about 300° C., and the polymer-filler mixture is compressed with about twenty-five tons of force for about fifteen minutes. After fully melting the polymer and the subsequent encapsulation of filler, the resulting slab is slowly cooled in the mold through an automatic cooling system in the machine and later removed from the compression molding machine, to be cooled slowly in air at room temperature for about thirty minutes. Utilizing a screen created to meet certain specifications, the polymer-filler solid slab is crushed in a normal crusher machine to form either coarse aggregate and/or fine aggregate at the desired gradation. As illustrated in FIG. 1, the synthetic RPA obtained by this process are then separated into different sizes to be mixed with cement and make concrete.

As discussed herein, the properties of the materials used in concrete have a great role in determining the quality of the concrete. As such, it is important to determine the physical, chemical and mechanical properties of the materials used. For illustration purposes only, tests were conducted comparing the various properties of ordinary concrete (NC), conventional lightweight concrete (LWC), and concrete comprising the inventive synthetic RPA prepared as described above. A conventional lightweight concrete (LWC) is produced as a control using a local conventional lightweight aggregate, which is a type of volcanic rock collected from the western region of the Arabian Peninsula. The properties of this conventional lightweight aggregate are tabulated in Table 2.

TABLE 2

Properties of Conventional Lightweight Aggregate

| Test | Result |
|---|---|
| Bulk Specific Gravity (OD Basis) | 1.41 |
| Bulk Specific Gravity (SSD Basis) | 1.67 |
| Apparent Specific Gravity | 1.41 |
| Absorption (%) | 18.6 |
| Dry Unit weight(dense condition) kg/m$^3$ | 697 |
| Voids (dense condition) (%) | 50 |
| Fineness Modulus | 6.5 |
| Type | Uncrushed |
| Maximum Size | 10 mm |

In the same manner for comparison purposes, natural crushed stone was used to produce normal concrete (NC). The properties of this natural aggregate are illustrated in Table 3.

TABLE 3

Properties of Natural Aggregate

| Test | Result |
|---|---|
| Bulk Specific Gravity (OD Basis) | 2.59 |
| Bulk Specific Gravity (SSD Basis) | 2.63 |
| Apparent Specific Gravity | 2.69 |
| Absorption (%) | 1.48 |
| Dry Unit weight(dense condition) kg/m$^3$ | 1608 |
| Voids (dense condition) (%) | 37.79 |
| Fineness Modulus | 5.83 |
| Type | Crushed |
| Maximum Size | 10 mm |

Synthetic recycled plastic was used to replace natural/conventional lightweight coarse aggregates at 100% replacement for making the inventive specimens of concrete including a synthetic RPA. These synthetic RPAs were manufactured in different sizes (as shown in FIG. 1) using different formulas. The properties of these synthetic RPAs are tabulated in Table 4. The samples are identified by a sample name of the format RPxFyA, where RPx is the number identifying the recycled plastic type and percentage, Fy is the number identifying the filler type and percentage, and A is aggregate.

TABLE 4

Properties of Synthetic RPAs Replacing Coarse Aggregates

| Test | $RP_3F_1A$ | $RP_3F_2A$ | $RP_3F_3A$ | $RP_4F_1A$ | $RP_4F_2A$ | $RP_4F_3A$ |
|---|---|---|---|---|---|---|
| Bulk Specific Gravity (OD Basis) | 1.81 | 1.68 | 1.79 | 1.95 | 1.79 | 1.94 |
| Bulk Specific Gravity (SSD Basis) | 1.83 | 1.69 | 1.81 | 1.97 | 1.81 | 1.97 |
| Apparent Specific Gravity | 1.84 | 1.69 | 1.83 | 2.01 | 1.83 | 2.00 |
| Absorption (%) | 0.89 | 0.56 | 0.95 | 1.38 | 1.21 | 1.68 |
| Dry Unit weight (dense condition) $kg/m^3$ | 1131.92 | 1057.95 | 1119.55 | 1260.37 | 1128.54 | 1222.65 |
| Voids (dense condition) (%) | 37.44 | 37.02 | 33.35 | 24.97 | 32.82 | 27.22 |
| Fineness Modulus | 5.795 | 5.568 | 5.671 | 5.869 | 5.646 | 5.743 |
| Type | Crushed | Crushed | Crushed | Crushed | Crushed | Crushed |
| Maximum Size | 10 mm | 10 mm | 10 mm | 10 mm | 10 mm | 10 mm |

For those mixes containing synthetic RPA and/or conventional lightweight aggregate, the quantity of the coarse aggregate is calculated by using the specific gravity of the synthetic RPA and/or conventional lightweight aggregate as a replacement for the specific gravity of natural coarse aggregates. The resultant mix proportions are illustrated in Table 5. In Table 5, the sample designation "NC" means normal concrete made using natural crushed stone, the designation "LWC" means concrete made with the conventional volcanic lightweight aggregate described above. Reference can be made to Table 1 for the compositions of the synthetic RPA designations used in Table 5. For example, the designation "RP3F1C" means synthetic RPA concrete with recycled plastic 3 (50% recycled PET) and filler 1 (50% dune sand).

TABLE 5

Mix Proportions for Sample Tests

| S.No | W/C Ratio | Water $Kg/m^3$ | Cement $Kg/m^3$ | Fine Aggregates $Kg/m^3$ | Coarse Aggregates $Kg/m^3$ | Lightweight Aggregates $Kg/m^3$ | Recycled Plastic Aggregates $Kg/m^3$ |
|---|---|---|---|---|---|---|---|
| NC0.5 | 0.5 | 243.32 | 450 | 586.85 | 1067.00 | — | — |
| LWC0.5 | 0.5 | 317.47 | 450 | 776.25 | — | — | — |
| $RP_3F_1C0.5$ | 0.5 | 234.70 | 450 | 547.36 | — | 471.89 | 765.74 |
| $RP_3F_2C0.5$ | 0.5 | 231.88 | 450 | 537.90 | — | — | 715.70 |
| $RP_3F_3C0.5$ | 0.5 | 235.19 | 450 | 551.60 | — | — | 757.37 |
| $RP_4F_1C0.5$ | 0.5 | 239.30 | 450 | 508.58 | — | — | 852.64 |
| $RP_4F_2C0.5$ | 0.5 | 237.05 | 450 | 536.60 | — | — | 763.45 |
| $RP_4F_3C0.5$ | 0.5 | 241.65 | 450 | 537.02 | — | — | 827.12 |

The results of the tests discussed below illustrate the effect that a specific aggregate can have on certain concrete properties. Specifically, the results illustrate the relation between slump, unit weight, compressive strength, splitting tensile strength, flexural strength, and chloride permeability for all of the synthetic RPA specimens having a water-to-cement ratio of 0.5.

Comparison of Concrete Slumps

Figure 2:
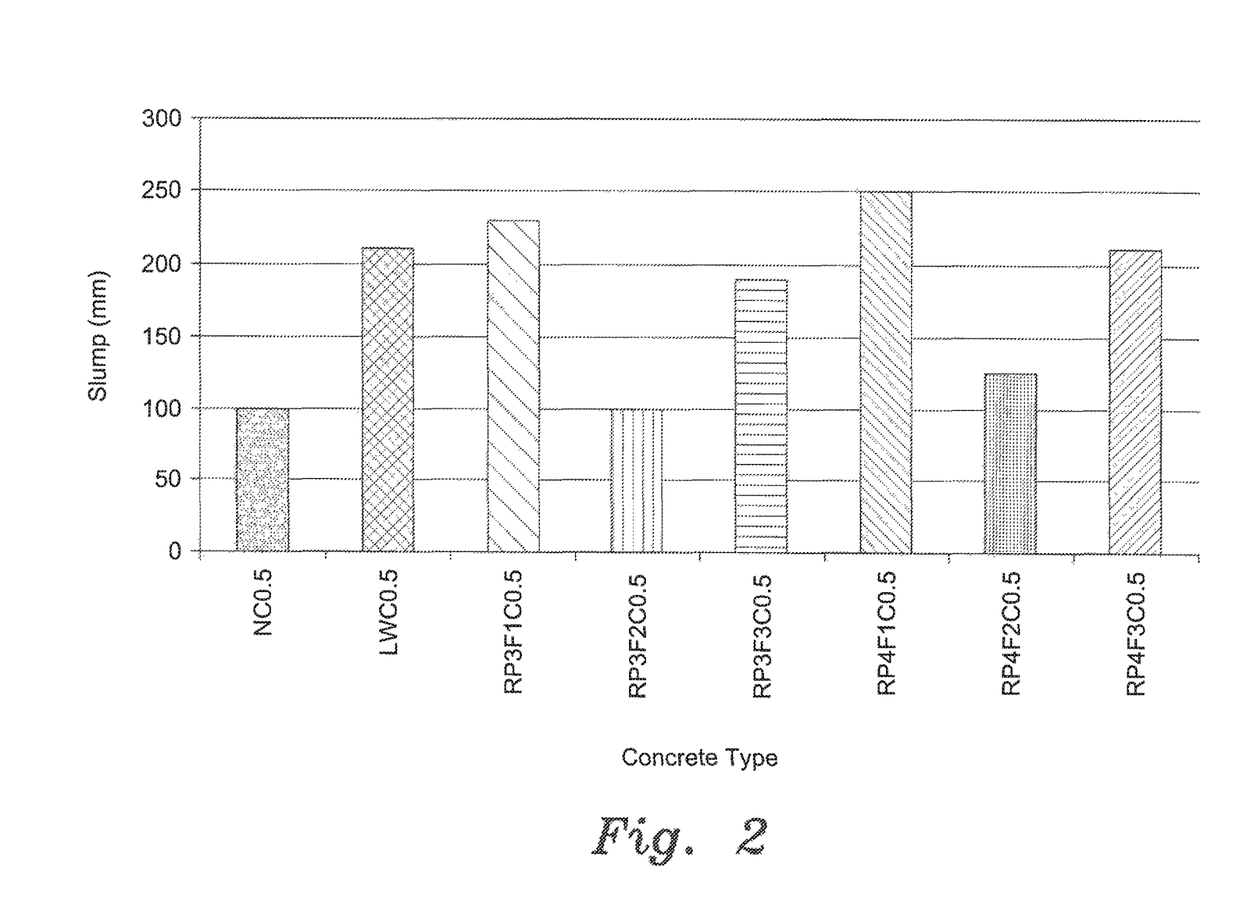
FIG. 2 is a graph illustrating a comparison of Slump for different cementitious compositions, including concrete samples having a synthetic recycled plastic aggregate and a water to cement ratio of 0.5, according to the present invention.
Figure 3:
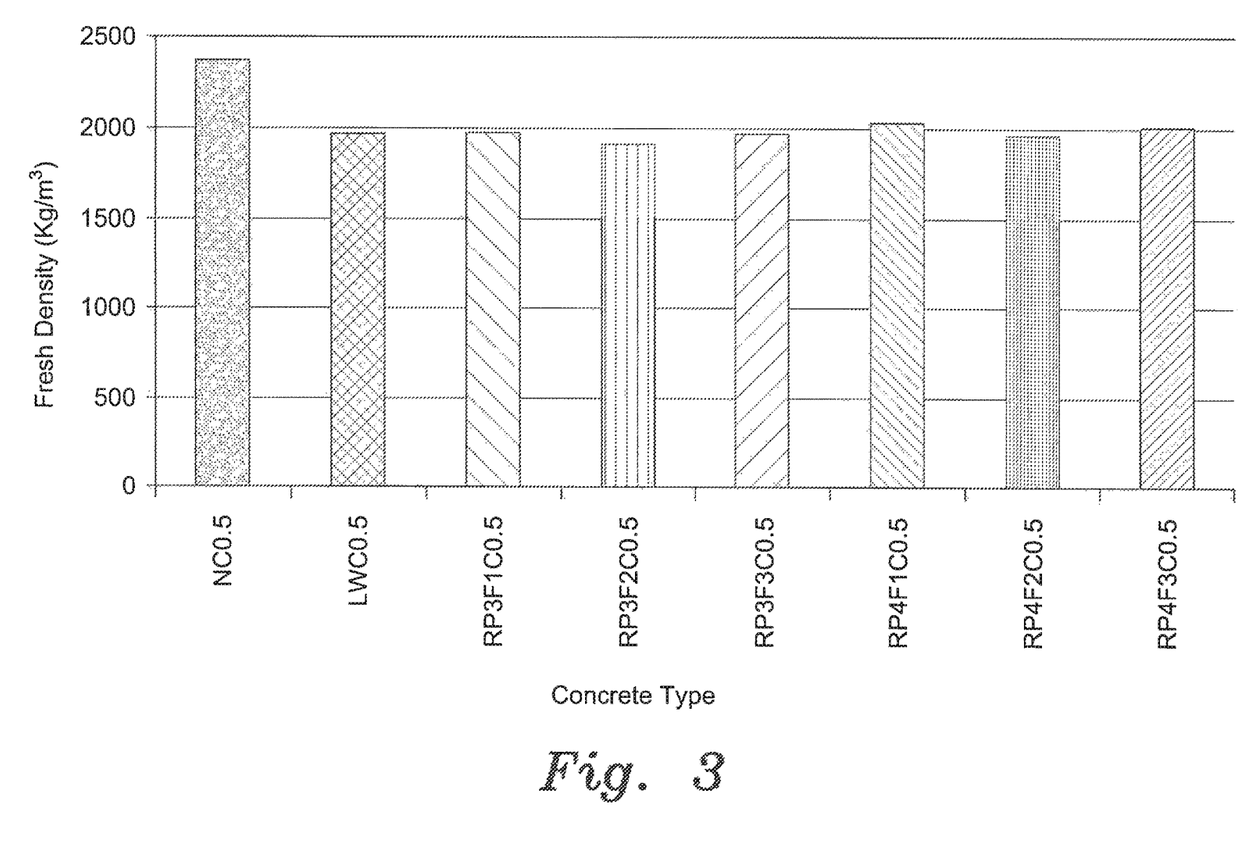
FIG. 3 is a graph illustrating a comparison of Fresh Concrete Densities for different cementitious compositions, including concrete samples having a synthetic recycled plastic aggregate and a water to cement ratio of 0.5, according to the present invention.

FIG. 2 illustrates a comparison of the slump (e.g. measure of workability of fresh concrete) of various concrete mixes done in this study. As shown in FIG. 2, there was, for the most part, an increase in slump of the synthetic RPAs as compared with normal concrete, whereas an unsteady trend was observed for lightweight concrete. For example, the slump of RP3F1C, RP3F2C, RP3F3C, RP4F1C, RP4F2C, and RP4F3C increased by 56.5, 0, 47.4, 60, 20, and 52.4, respectively, as compared with normal concrete. When compared to lightweight concrete, the slump of RP3F1C and RP4F1C increased by 9% and 16%, respectively. On the other hand, the slump of RP3F2C, RP3F3C, and RP4F2C decreased by 52%, 10%, 40%, respectively, as compared to lightweight concrete. Furthermore, the recycled plastic concrete results showed that with the increase in percentage of dune sand, $f_{ly}$ ash, and quarry fine fillers from 50% to 70% the slump increased by 8%, 20%, and 10%, respectively, Comparison of Concrete Densities FIG. 3 illustrates a comparison of the fresh densities of various concrete mixes done in this study, As shown in FIG. 3, the general trend observed was that the fresh density of the synthetic RPA concrete was significantly reduced as compared to normal concrete. Whereas, insignificant trend was noted when a similar comparison was made between RPA concrete and conventional lightweight concrete. The fresh density of RP3F1C, RP3F2C, RP3F3C, RP4F1C, RP4F2C, and RP4F3C decreased by 17%, 19%, 16%, 14%, 17%, and 15%, respectively, when compared to normal concrete. The fresh density of RP3F3C, RP4F1C, and RP4F3C was seen to increase by 1%, 3%, and 2%, respectively, when compared to conventional lightweight concrete. The fresh density of RP3F2C decreased by 3%. The fresh densities of RP3F1C and RP4F2C were the same as that of conventional lightweight concrete.

Compressive Strength Test

Figure 4:
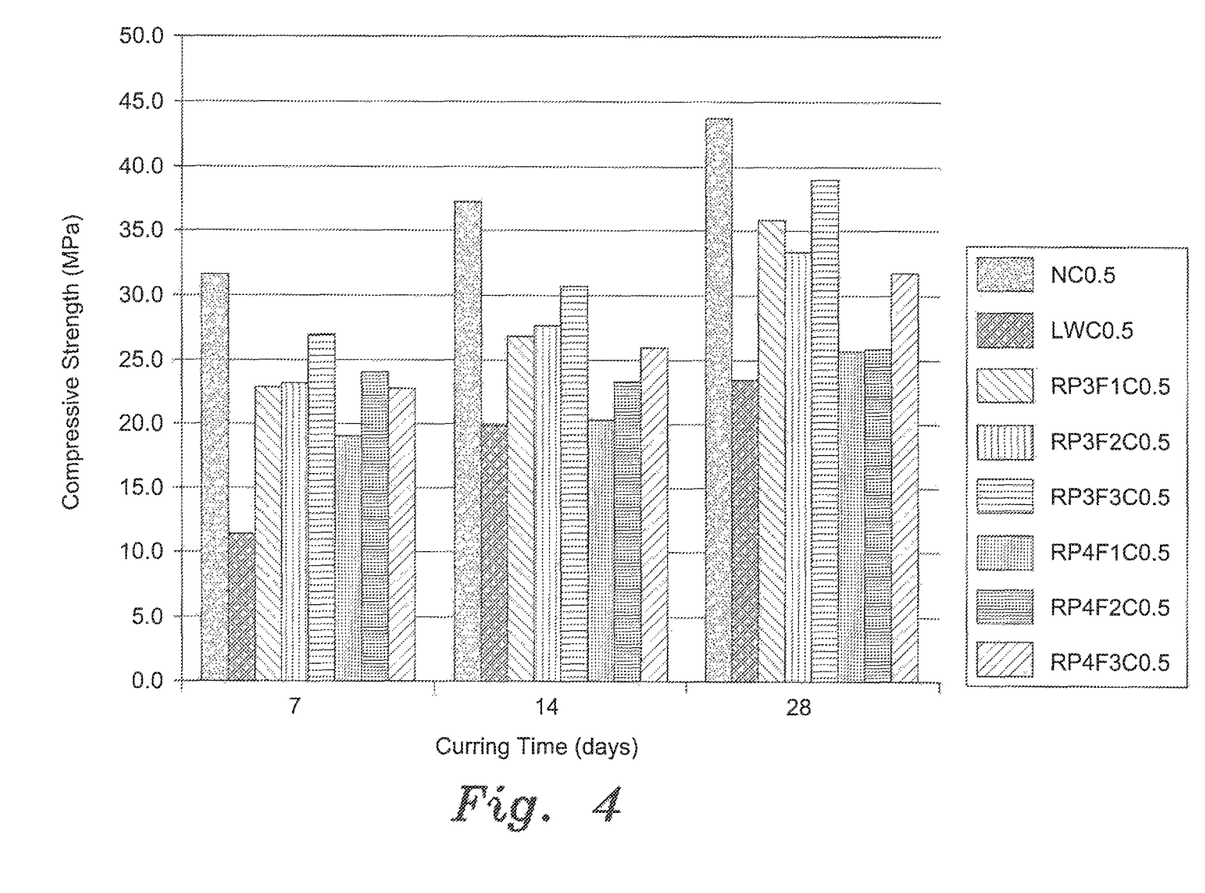
FIG. 4 is a graph illustrating a comparison of Compression Strength as a function of curing time (in days) for normal concrete, conventional lightweight concrete and concrete having a synthetic recycled plastic aggregate and a water to cement ratio of 0.5 according to the present invention.

FIG. 4 illustrates a comparison of the compressive strengths of each specimen that was prepared by casting the fresh concrete in two layers in steel cubic molds with dimensions of 50×50×50 mm. Each layer was subjected to vibration for 3 seconds. After twenty-four (24) hours, the cubic specimens were &molded and cured in water at a temperature of 20° C. 2° C. for 7, 14 and 28 days, respectively. After the curing process, the cubes were tested by a compressive strength machine to measure the compressive load and compressive strength at which the cubes will fail.

Continuing with reference to FIG. 4, the compression strengths of normal concrete, conventional lightweight concrete, and concrete containing a synthetic RPA having a water-to-cement ratio of 0.5 is illustrated. The compression strength of all mixes increases with the curing period (e.g. from 7 to 14 days and from 14 to 28 days). The general trend observed was that the compressive strength of RPA concrete increased as compared to the conventional lightweight concrete but decreased as compared to normal concrete. The percentage increase in the compressive strength of RP3F1C, RP3F2C, RP3F3C, RP4F1C, RP4F2C, RP4F3C was 50%, 50%, 57%, 40%, 52%, 49%, respectively, at seven (7) days, 26%, 28%, 35%, 2%, 15%, 23%, respectively, at fourteen (14) days, and 35%, 30%, 40%, 8%, 9%, 26%, respectively, at twenty-eight (28) days as compared to conventional lightweight concrete.

The percentage decrease in compressive strength of RP3F1C, RP3F2C, RP3F3C, RP4F1C, RP4F2C, and RP4F3C was 27%, 27%, 15%, 40%, 24%, and 28%, respectively, after seven (7) days, 28%, 26%, 18%, 45%, 37%, and 30%, respectively, at fourteen (14) days, and 18%, 24%, 11%, 41%, 41%, and 27%, respectively, at twenty eight (28) days as compared to normal concrete. Among the RPA concrete the results showed that the compressive strength is decreased as the percentage of filler, such as dune sand, fly ash, and quarry fines, is increased from 50% to 70%. As demonstrated by the results described herein, RPA concrete satisfy the ASTM C330 requirement for compressive strength. Therefore, it can be used for such structural applications.

The reduction in compression strength of the RPA compared to the normal concrete was expected due to the weakness of the aggregate compared to natural crushed stone and the weakness in the bonding between cement mortar and synthetic RPA particles. This weakness is due to differences in surface texture and size of synthetic plastic aggregate particles.

Splitting Tensile Strength Test

The splitting tensile strength of concrete was calculated using the compression machine test. Cylinder specimens were made to be tested at six, fourteen, and twenty-eight days using cylinder having a diameter of 50 mm and a depth of 100 mm.

Figure 5:
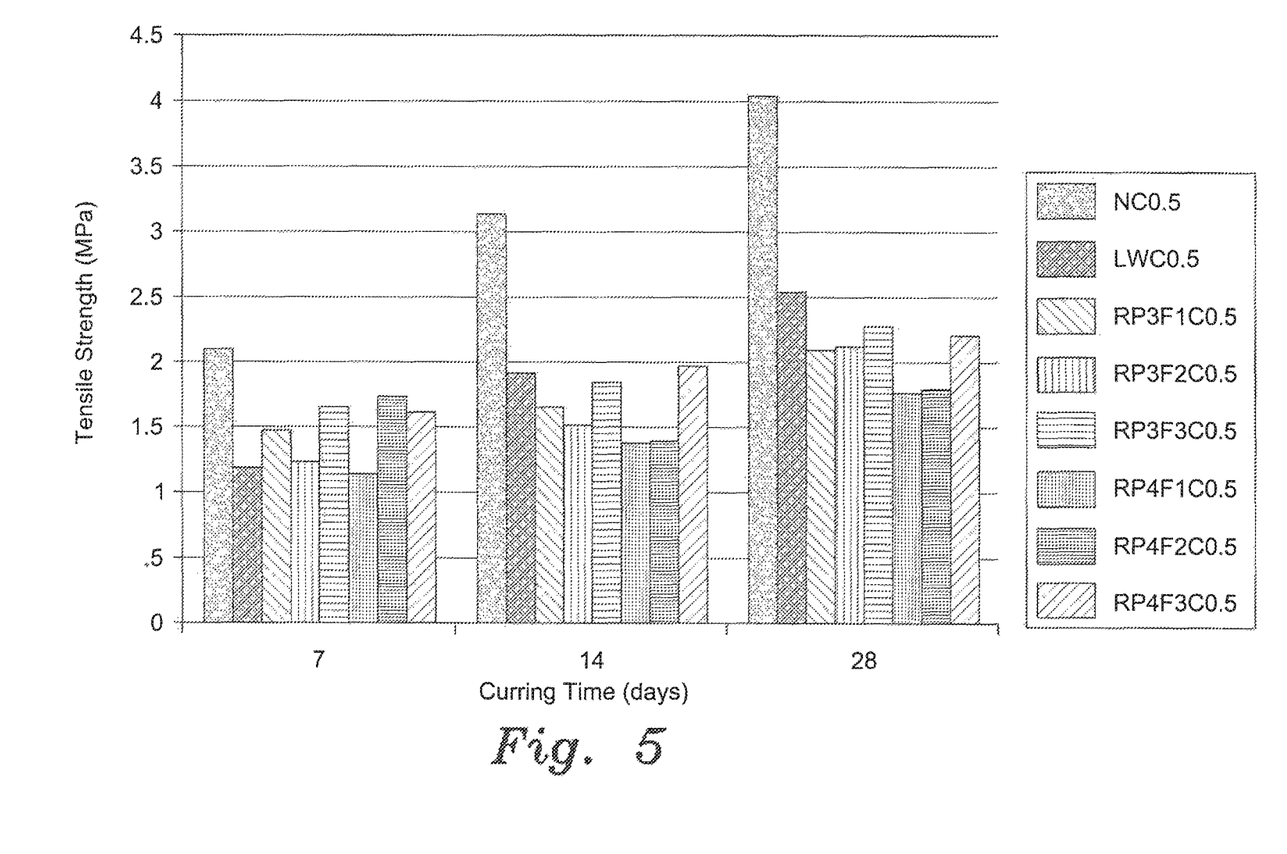
FIG. 5 is a graph illustrating a comparison of Splitting Tensile Strength as a function of curing time (in days) for normal concrete, conventional lightweight concrete and concrete having a synthetic recycled plastic aggregate and a water to cement ratio of 0.5 according to the present invention.

Comparison of splitting tensile strengths for the concrete mixes made with RPA having a water-to-cement ratio of 0,5 are presented in FIG. 5. The general trend observed was that the splitting tensile strength for all mixes increased with the curing period.

The splitting tensile strength of RPA concrete increased initially compared to the splitting tensile strength of conventional lightweight concrete, but tended to decrease after fourteen and twenty-eight days, respectively. At seven days, for example, the percentage increase in splitting tensile strength of RP3F1C, RP3F2C, RP3F3C, RP4F1C, RP4F2C, and RP4F3C was 20%, 5%, 29%, 4%, 32%, and 27%, respectively, as compared to conventional lightweight concrete. Whereas, at fourteen and twenty-eight days the percentage decrease was 14%, 21%, 3%, 29%, 28%, 3%, respectively, and 18%, 17%, 11%, 31%, 30%, and 13%, respectively as compared to conventional lightweight concrete.

The general trend observed for the splitting tensile strength of RPA concrete compared to normal concrete was a decrease at all stages, When compared to normal concrete, the percentage decrease in splitting tensile strength of RP3F1C, RP3F2C, RP3F3C, RP4F1C, RP4F2C, and RP4F3C was 29%, 41%, 21%, 46%, 17%, and 23%, respectively, at seven days, 47%, 51%, 41%, 56%, 56%, and 37%, respectively, at fourteen days, and 48%, 48%, 44%, 56%, 56%, and 45%, respectively at twenty-eight days. Among the RPA concrete, the results showed that the splitting tensile strength increased as the percentage of filler (dune sand, fly ash and quarry fines) increased from 50% to 70%, As demonstrated by the results described herein, RPA concrete satisfy the ASTM C330 requirement for splitting tensile strength. Therefore, it can be used for such structural applications.

It is to be noted that the factors causing reduction in the splitting tensile strength in concrete containing synthetic RPA are the same as that which cause reduction in the compressive strength, as stated previously.

Flexural Strength Test

Using a simple beam (Prism) with one point loading, the flexural strength specimens were prepared by casting the fresh concrete in two layers in steel prism beam molds with dimension 160×40×40 mm, in which each layer was subjected to vibration for three (3) seconds, After twenty-four (24) hours, the beam specimens were demolded, and cured in water at a temperature of 20° C. ±2° C. for seven, fourteen, and twenty-eight days, After the curing process, the beams were tested by flexural strength machine to measure the flexural load and strength at which the beams will fail.

Figure 6:
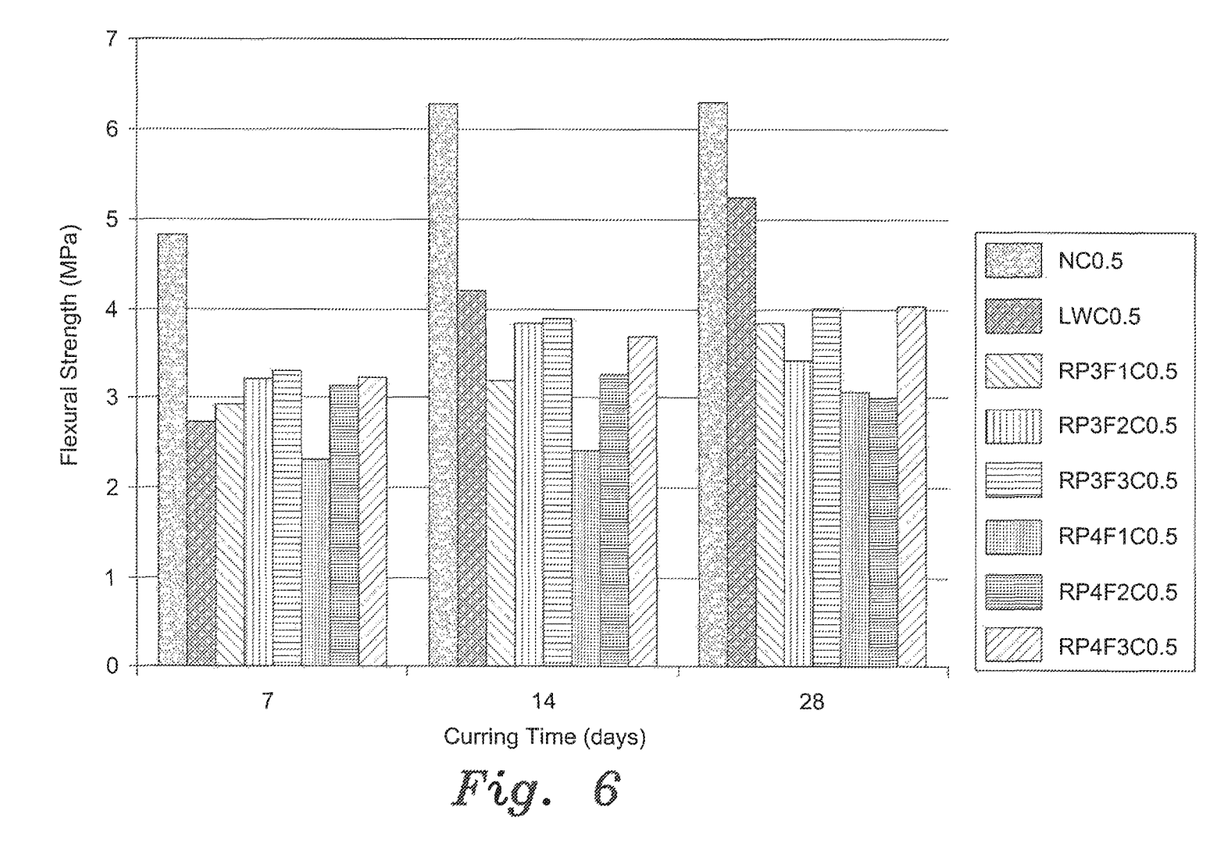
FIG. 6 is a graph illustrating a comparison of Flexural Strength as a function of curing time for normal concrete, conventional lightweight concrete and concrete having a synthetic recycled plastic aggregate and a water to cement ratio of 0.5 according to the present invention.

In FIG. 6, a comparison of flexural strengths of normal, conventional lightweight, and synthetic recycled plastic concretes cast at a water-to-cement ratio of 0.5 is shown. The general trend is that the flexural strength of all mixes increases with the curing period.

The flexural strength of RPA concrete increased as compared to conventional lightweight concrete but reduced as compared to normal concrete, The percentage increase in flexural strength of RP3F1C, RP3F2C, RP3F3C, RP4FIC, RP4F2C and RP4F3C was 5%, 14%, 16%, 21, 12%, and 14%, respectively at seven days, 24%, 8%, 7%, 42%, 22%, and 12%, respectively, at fourteen days, and 26%, 34%, 23%, 41%, 43%, and 23%, respectively, at twenty-eight days as compared to conventional lightweight concrete. On the other hand the percentage decrease in flexural strength of RP3F1C, RP3F2C, RP3F3C, RP4F1C, RP4F2C and RP4F3C was 39%, 33%, 31%, 52%, 35%, and 33%, respectively, at seven days, 49%, 39%, 38%, 61%, 48%, and 41%, respectively, at fourteen days, and 39%, 46%, 36%, 51%, 52%, and 36%, respectively, at twenty-eight days as compared to normal concrete. Among the RPA concrete, the results showed that the flexural strength increased as the percentage of filler (dune sand, fly ash and quarry fines) increased from 50% to 70%.

The reason behind this reduction is the same as that for compressive strength reduction, as mentioned earlier. Moreover, there are two main reasons for reduction in flexural strength of such concrete. One is a decrease in the amount of solid material carrying load, which was replaced by RPA. The second reason is concentration of stresses around the boundaries of recycled plastic aggregates.

Chloride Permeability

Figure 7:
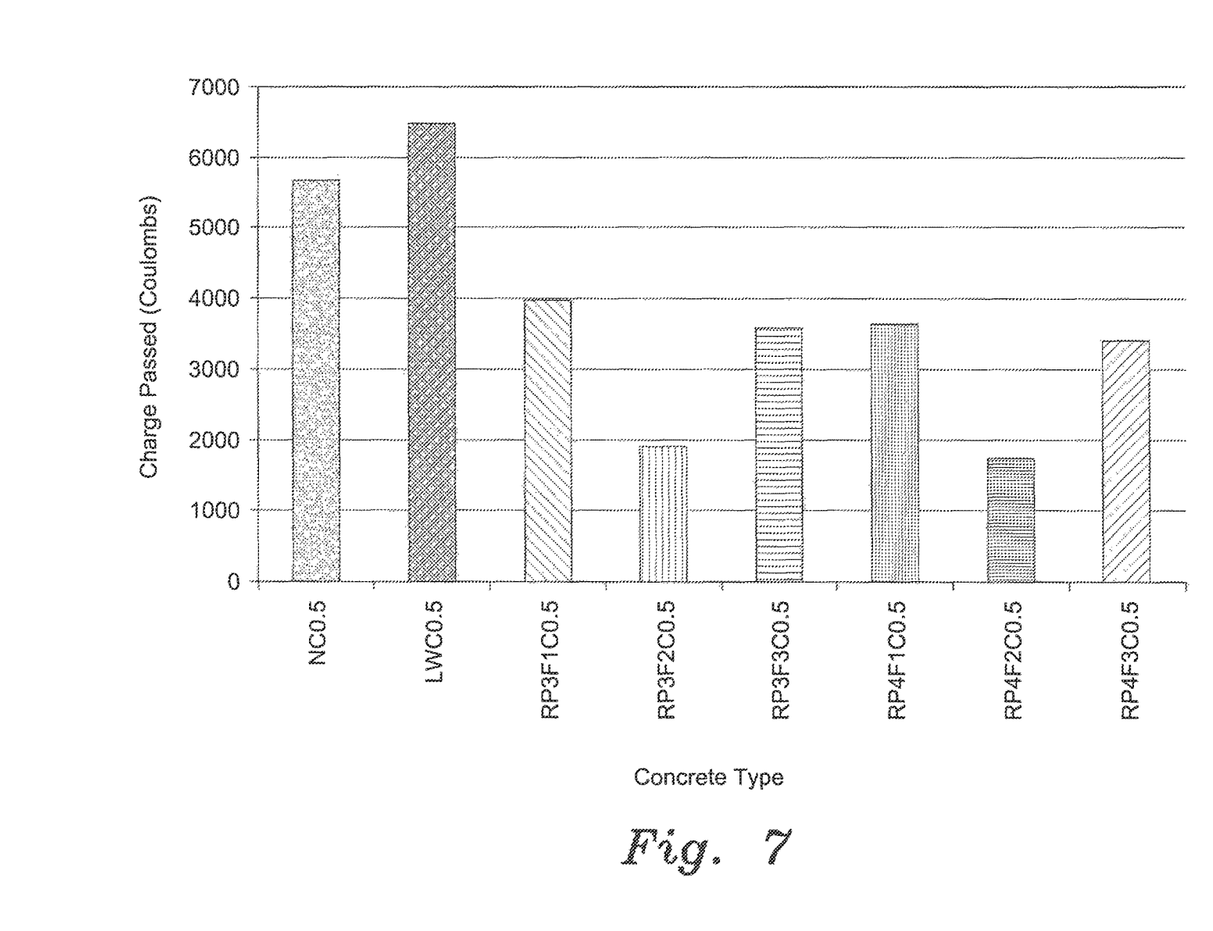
FIG. 7 is a graph illustrating a comparison of chloride permeability for normal concrete, conventional lightweight concrete and concrete having a synthetic recycled plastic aggregate for use in concrete according to the present invention.

FIG. 7 illustrates the effect of incorporating RPA in concrete on chloride ion permeability at twenty-eight days. The general trend observed was that the charge passing through RPA concrete samples decreased as compared to normal concrete and conventional lightweight concrete. Results show that the Chloride ion penetrability for RP3F1C, RP3F2C, RP3F3C, RP4F1C, RP4F2C and RP4F3C decreased by 30%, 66%, 36%, 36%, 69%, and 40%, respectively, as compared to normal concrete. Similarly, the chlorine ion permeability decreased by 38%, 70%, 44%, 44%, 73%, and 47%, respectively, when compared to conventional lightweight concrete.

This means that the resistance of concrete containing synthetic RPA to chloride ion penetrability increases with the incorporation of RPA. This may he because recycled plastic aggregate particles block or distract the transferof chloride ions.

The synthetic RPA can be used as a total replacement of the natural/conventional lightweight aggregates in concrete. Use of plastic aggregate in concrete has certain advantages associated with its strength, light weight, durability, and elastic properties, As it is acknowledged that aggregate occupies nearly 70% to 75% of concrete volume, use of higher amounts of low weight materials (such as plastic) can contribute significantly to lightweight concrete. Lightweight concrete is useful in applications requiring concrete with a low density, such as pavement, floating structures, and shock absorbing structures. Moreover, the elastic properties of plastic will improve the elasticity of concrete and allow it to resist deformation.

Further, the presence of synthetic RPA in the concrete can make it more ductile and, as such, can significantly increase its deformation before dramatic failure. The concrete containing this property is more durable and can be utilized in applications that are exposed to severe chemical attack, such as chloride ion penetrability.

It is to be understood that the present invention is not limited to the embodiments described above, but encompasses any and all embodiments within the scope of the following claims.

I claim:

1. A method of making a synthetic recycled plastic aggregate for use in concrete, consisting of the sequential steps of:
   shredding and grinding a recycled plastic, the recycled plastic including polyethylene terephthalate (PET), wherein the shredded and ground recycled plastic has a maximum particle size of 2.36 mm;
   dry mixing the shredded and ground recycled plastic with filler to form a homogenized mixture, wherein the filler has a maximum particle size of 0.15 mm;
   drying the homogenized mixture;
   pouring the homogenized mixture into a mold;
   heating the homogenized mixture in the mold to about 300° C. and compressing the homogenized mixture in the mold by applying 30 tons of pressure using a compression molding press machine for 15 minutes to embed the filler in a matrix of the melted shredded and ground recycled plastic, the heating and compressing occurring at the same time;
   cooling the mold at room temperature for about 30 min to form a composite of filler encapsulated in a matrix of the recycled plastic; and
   crushing the composite to form particles of synthetic recycled plastic aggregate for use in making concrete, the synthetic recycled plastic aggregate including from about 30% to about 50% by weight of the recycled plastic, with the balance being the filler.

2. The method of making a synthetic recycled plastic aggregate for use in concrete according to claim 1, wherein drying the homogenized mixture comprises heating the homogenized mixture in an oven at a temperature of about 110° C.±5° C.

3. The method of making a synthetic recycled plastic aggregate for use in concrete according to claim 1, further comprising cooling the mold in the machine for about five minutes using an automated cooling system prior to cooling at room temperature.

4. The method of making a synthetic recycled plastic aggregate for use in concrete according to claim 1, wherein the mold is a flat mold.

5. The method of making a synthetic recycled plastic aggregate for use in concrete according to claim 1, wherein the filler is selected from the group consisting of dune sand, fly ash, and quarry fines.

6. The method of making a synthetic recycled plastic aggregate for use in concrete according to claim 1, wherein the step of crushing the composite comprises crushing the composite to form a coarse aggregate.

7. The method of making a synthetic recycled plastic aggregate for use in concrete according to claim 1, wherein the step of crushing the composite comprises crushing the composite to form a fine aggregate.

\* \* \* \* \*